United States Patent
Evans et al.

(10) Patent No.: US 12,331,688 B1
(45) Date of Patent: Jun. 17, 2025

(54) CRYOGENIC BOTTOMING CYCLE WITH VARIABLE FLUID MIXTURE

(71) Applicant: RTX CORPORATION, Farmington, CT (US)

(72) Inventors: Brandon M. Evans, San Antonio, TX (US); Neil J. Terwilliger, Cheshire, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/793,170

(22) Filed: Aug. 2, 2024

(51) Int. Cl.
*F02C 7/224* (2006.01)
*F02C 1/10* (2006.01)
*F02C 3/22* (2006.01)
*F02C 7/141* (2006.01)

(52) U.S. Cl.
CPC ............... *F02C 7/224* (2013.01); *F02C 1/10* (2013.01); *F02C 3/22* (2013.01); *F02C 7/141* (2013.01); *F05D 2220/323* (2013.01); *F05D 2260/213* (2013.01)

(58) Field of Classification Search
CPC .... F02C 7/224; F02C 1/10; F02C 3/22; F02C 7/141; F05D 2220/323; F05D 2260/213
See application file for complete search history.

(56) References Cited

U.S. PATENT DOCUMENTS

| | | | |
|---|---|---|---|
| 12,104,535 B2 * | 10/2024 | Natsui | F02C 7/18 |
| 2013/0340434 A1 * | 12/2013 | Palmer | F01K 19/04 60/676 |
| 2014/0318134 A1 * | 10/2014 | Popovic | F02C 3/22 60/734 |
| 2016/0195013 A1 | 7/2016 | Epstein et al. | |
| 2024/0026824 A1 | 1/2024 | Terwilliger et al. | |

* cited by examiner

*Primary Examiner* — Todd E Manahan
*Assistant Examiner* — Rodolphe Andre Chabreyrie
(74) *Attorney, Agent, or Firm* — Carlson, Gaskey & Olds, P.C.

(57) ABSTRACT

An aircraft propulsion system includes a core engine that includes a main compressor where an inlet airflow is compressed and communicated to a combustor to generate an exhaust gas flow that is expanded through a main turbine section to generate power used to drive the main compressor and a propulsive fan, a bottoming cycle where a working fluid mixture within a closed circuit is heated and expanded through a bottom turbine to generate shaft power, the working fluid mixture includes at least two fluids that have different properties that change a capability of the working fluid mixture at different bottoming cycle operating points, a first heat exchanger where heat is input into the working fluid mixture, and a second heat exchanger where the working fluid mixture is cooled.

20 Claims, 5 Drawing Sheets

CRYOGENIC BOTTOMING CYCLE WITH VARIABLE FLUID MIXTURE

TECHNICAL FIELD

The present disclosure relates generally to a bottom cycle for an aircraft propulsion system and more specifically to a bottoming cycle with a working fluid mixture that utilizes a cryogenic fuel as a heat sink.

BACKGROUND

Gas turbine engines typically include a compressor where inlet air is compressed and delivered into a combustor. In the combustor, the compressed air is mixed with fuel and ignited to generate an exhaust gas flow. The exhaust flow is expanded through a turbine section to generate shaft power used to drive the compressor and a propulsive fan. Some energy in the high energy exhaust flow is recovered as it is expanded through a turbine section. However, a large amount of energy in the form of heat is simply exhausted from the turbine section to the atmosphere. A bottoming cycle utilizes reclaimed heat to generate additional useful work. A working fluid in the bottoming cycle is heated to drive a secondary turbine to generate additional shaft power. The working fluid in the bottoming cycle is then cooled, compressed, and reheated before expansion back through the secondary turbine. The capability of the working fluid to accept heat limits energy recovery of the bottoming cycle. Moreover, different working fluids may work better at different operating conditions. Accordingly, use of a single working fluid may require compromises in performance at some operating conditions.

SUMMARY

An aircraft propulsion system according to an exemplary embodiment of this disclosure, among other possible things includes a core engine that includes a main compressor where an inlet airflow is compressed and communicated to a combustor to generate an exhaust gas flow that is expanded through a main turbine section to generate power used to drive the main compressor and a propulsive fan, a bottoming cycle where a working fluid mixture within a closed circuit is heated and expanded through a bottom turbine to generate shaft power, the working fluid mixture includes at least two fluids that have different properties that change a capability of the working fluid mixture at different bottoming cycle operating points, a first heat exchanger where heat is input into the working fluid mixture, and a second heat exchanger where the working fluid mixture is cooled.

In a further embodiment of the foregoing, the aircraft propulsion system further includes a cryogenic fuel system that includes a cryogenic fuel storage tank, a fuel flow path for routing the cryogenic fuel to the combustor of the core engine, the second heat exchanger provides for thermal communication between fuel flow in the fuel flow path and the working fluid mixture.

In a further embodiment of any of the foregoing aircraft propulsion systems, the first heat exchange communicates thermal energy from the exhaust gas flow into the working fluid mixture.

In a further embodiment of any of the foregoing aircraft propulsion systems, the different bottoming cycle operating points include different temperatures of the working fluid mixture.

In a further embodiment of any of the foregoing aircraft propulsion systems, the working fluid mixture includes a first fluid with a first condensation temperature and a second fluid with a second condensation temperature that is different than the first condensation temperature, and the capability of the working fluid mixture varies in response to a ratio between the first fluid and the second fluid.

In a further embodiment of any of the foregoing, the aircraft propulsion system further includes a controller that is programmed to operate the bottoming cycle to vary a ratio between the first fluid and the second fluid that include the working fluid in response to an operating condition of the core engine.

In a further embodiment of any of the foregoing, the aircraft propulsion system further includes at least one fluid chamber that is in fluid communication with the closed circuit of the bottoming cycle where at least a portion of one of the first fluid and the second fluid accumulates separate from the working fluid mixture that circulates within the closed circuit in response to a predefined temperature of the working fluid mixture.

In a further embodiment of any of the foregoing aircraft propulsion systems, at least one fluid chamber includes a first fluid chamber where the first fluid accumulates and a second fluid chamber where the second fluid accumulates.

In a further embodiment of any of the foregoing, the aircraft propulsion system further includes at least one separator for separating one of the first fluid and the second fluid from the closed circuit.

In a further embodiment of any of the foregoing, the aircraft propulsion system further includes at least one condenser for condensing one of the first fluid and the second fluid of the working fluid mixture.

In a further embodiment of any of the foregoing, the aircraft propulsion system further includes a first fluid pump where the first fluid from the first chamber is pressurized and a second pump where the second fluid from the second chamber is pressurized.

A gas turbine engine according to another exemplary embodiment of this disclosure, among other possible things includes a core engine that includes a main compressor where an inlet airflow is compressed and communicated to a combustor to generate an exhaust gas flow that is expanded through a main turbine section to generate power that is used to drive the main compressor, a bottoming cycle where a working fluid mixture within a closed circuit is heated and expanded through a bottom turbine to generate shaft power, the working fluid mixture includes at least two fluids that have different properties that change a capability of the working fluid mixture at different bottoming cycle operating points, a cryogenic fuel system that includes a cryogenic fuel storage tank, a fuel flow path for routing the cryogenic fuel to the combustor of the core engine, a first heat exchanger where heat from the core engine is input into the working fluid mixture, a second heat exchanger where the working fluid mixture is cooled by a flow of the cryogenic fuel, and a controller that is programmed to operate the bottoming cycle to vary a composition of the working fluid mixture in response to an operating condition of the core engine.

In a further embodiment of the foregoing gas turbine engine, the working fluid mixture includes a first fluid with a first condensation temperature and a second fluid with a second condensation temperature that is different than the first condensation temperature, and the capability of the working fluid mixture varies in response to a ratio between the first fluid and the second fluid.

In a further embodiment of any of the foregoing, the gas turbine engine further includes at least one fluid chamber that is in fluid communication with the closed circuit of the bottoming cycle where at least a portion of one of the first fluid and the second fluid accumulates separate from the working fluid mixture that circulates within the closed circuit in response to a predefined temperature of the working fluid mixture.

In a further embodiment of any of the foregoing, the gas turbine engine further includes at least one separator for separating one of the first fluid and the second fluid from the closed circuit.

In a further embodiment of any of the foregoing, the gas turbine engine further includes at least one fluid pump for pressurizing one of the first fluid and the second fluid independent of pressures within the closed circuit.

A method of operating an aircraft propulsion system according to another exemplary embodiment of this disclosure, among other possible things includes generating an exhaust gas flow in a combustor by igniting a mixture of compressed air and a cryogenic fuel, communicating thermal energy from the exhaust gas flow into a working fluid mixture within a bottoming cycle where a heated working fluid within a closed circuit is heated and expanded through a bottom turbine to generate shaft power, the working fluid mixture includes at least two fluids that have different properties that change a capability of the working fluid mixture at different bottoming cycle operating points, cooling the working fluid that is exhausted from the bottoming turbine in a fuel/working fluid heat exchanger where a cryogenic fuel accepts heat from the working fluid mixture, and adjusting a composition of the working fluid mixture by removing a condensed portion of the first fluid and the second fluid from circulation through the closed circuit of the bottoming cycle.

In a further embodiment of the foregoing, the method further includes adjusting the working fluid mixture to provide a first ratio between the first fluid and the second fluid in response to a first operating condition of the aircraft propulsion system and adjusting the working fluid mixture to provide a second ratio between the first fluid and the second fluid in response to a second operating condition of the aircraft propulsion system.

In a further embodiment of any of the foregoing, the method further includes adjusting the working fluid mixture by condensing, separating, and storing one of the first fluid and second fluid.

In a further embodiment of any of the foregoing, the method further includes adjusting the working fluid mixture by injecting a liquid form of one of the first fluid and the second fluid back into the closed circuit of the bottoming cycle.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
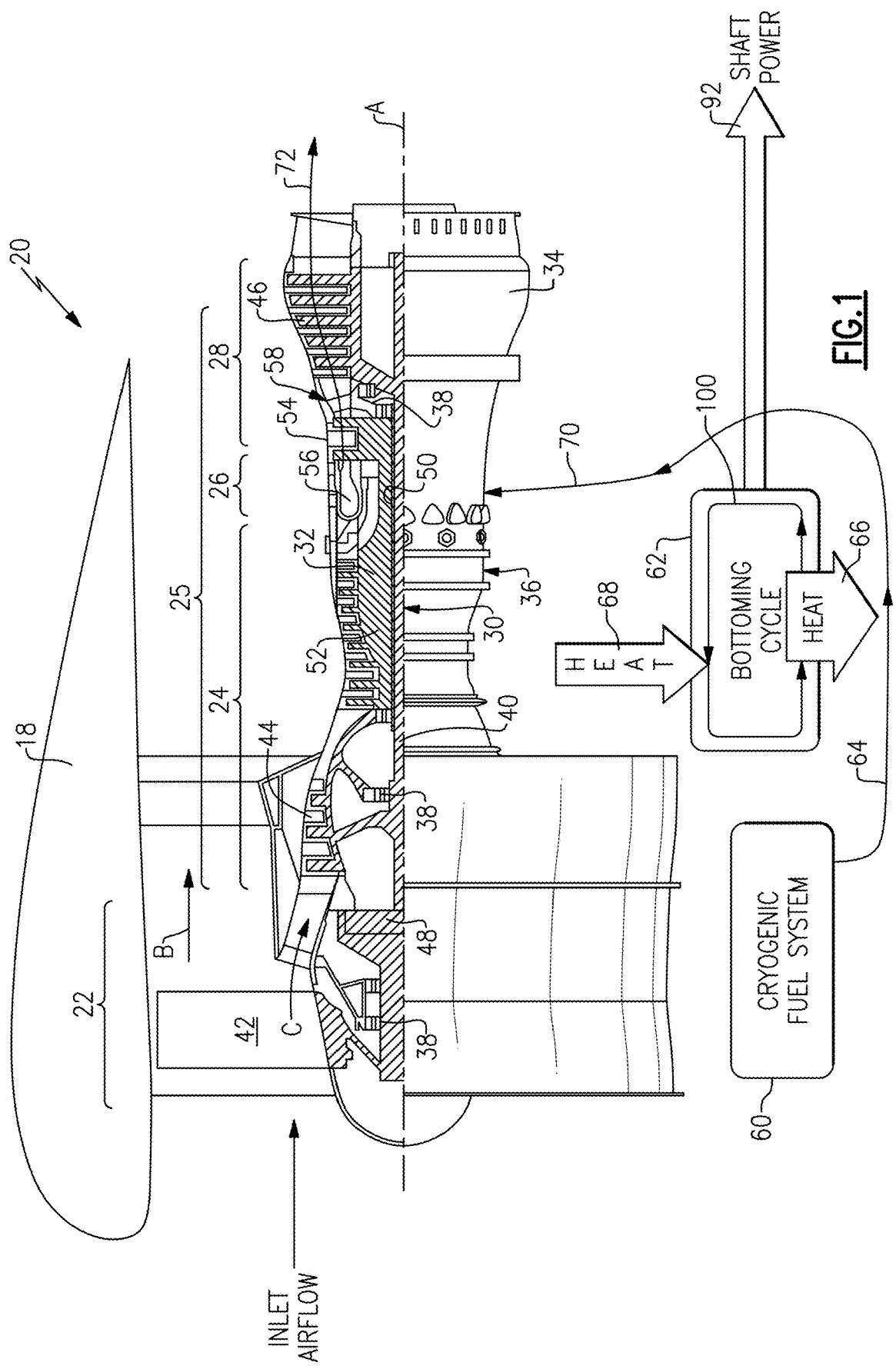
FIG. 1 is a schematic view of an example aircraft propulsion system including a bottoming cycle.

FIG. 1 schematically illustrates an aircraft propulsion system 20 that includes a cryogenic fuel system 60 and a bottoming cycle 62. Heat 68 generated in the propulsion system 20 is used to heat a working fluid mixture 100 of the bottoming cycle 62. The heated working fluid mixture 100 is used to generate shaft power 92. Heat 66 from the working fluid mixture 100 is communicated to a liquid cryogenic fuel flow 64 to both heat the fuel flow 64 and cool the working fluid mixture 100. The working fluid mixture 100 is a mixture of different fluids with different properties that provide for adaptation of the bottoming cycle 62 to different temperatures and operating conditions of the propulsion system 20.

The example propulsion system 20 is disclosed as a two-spool turbofan that generally incorporates a fan section 22 and a core engine 25 that generates an exhaust gas flow 72 that is expanded through a turbine section 28 that is configured to drive the fan section 22. The core engine 25 includes a compressor section 24, a combustor section 26, and a turbine section 28. The fan section 22 may include a single-stage fan having a plurality of fan blades 42. The fan blades 42 may have a fixed stagger angle or may have a variable pitch to direct incoming airflow from an engine inlet. The fan 22 drives air along a bypass flow path B defined within a nacelle 18, and also drives air along a core flow path C for compression and communication into the combustor section 26 then expansion through the turbine section 28. Exhaust gas flow 72 is finally exhausted through a nozzle 34.

The exemplary core engine 25 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner engine shaft 40 that interconnects, a first (or low) pressure compressor 44 and a first (or low) pressure turbine 46. The inner engine shaft 40 is connected to the fan section 22 through a speed change mechanism, which in one example is illustrated as a geared architecture 48 to drive the fan section 22 at a lower speed than the low speed spool 30. The inner engine shaft 40 may interconnect the low pressure compressor 44 and low pressure turbine 46 such that the low pressure compressor 44 and low pressure turbine 46 are rotatable at a common speed and in a common direction. Although this application discloses geared architecture 48, its teaching may benefit direct drive engines having no geared architecture.

The high speed spool 32 includes an outer engine shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner engine shaft 40 and the outer engine shaft 50 are concentric and rotate via bearing systems 38 about the engine central longitudinal axis A which is collinear with their longitudinal axes.

Although an example engine architecture is disclosed by way of example, other turbine engine architectures are within the contemplation and scope of this disclosure. Moreover, although the disclosed non-limiting embodiment depicts a turbofan turbine engine, it should be understood that the concepts described herein are not limited to use with turbofans as the teachings may be applied to other types of turbine engines. Additionally, the features of this disclosure may be applied to other engine configurations utilized to generate shaft power.

Figure 2:
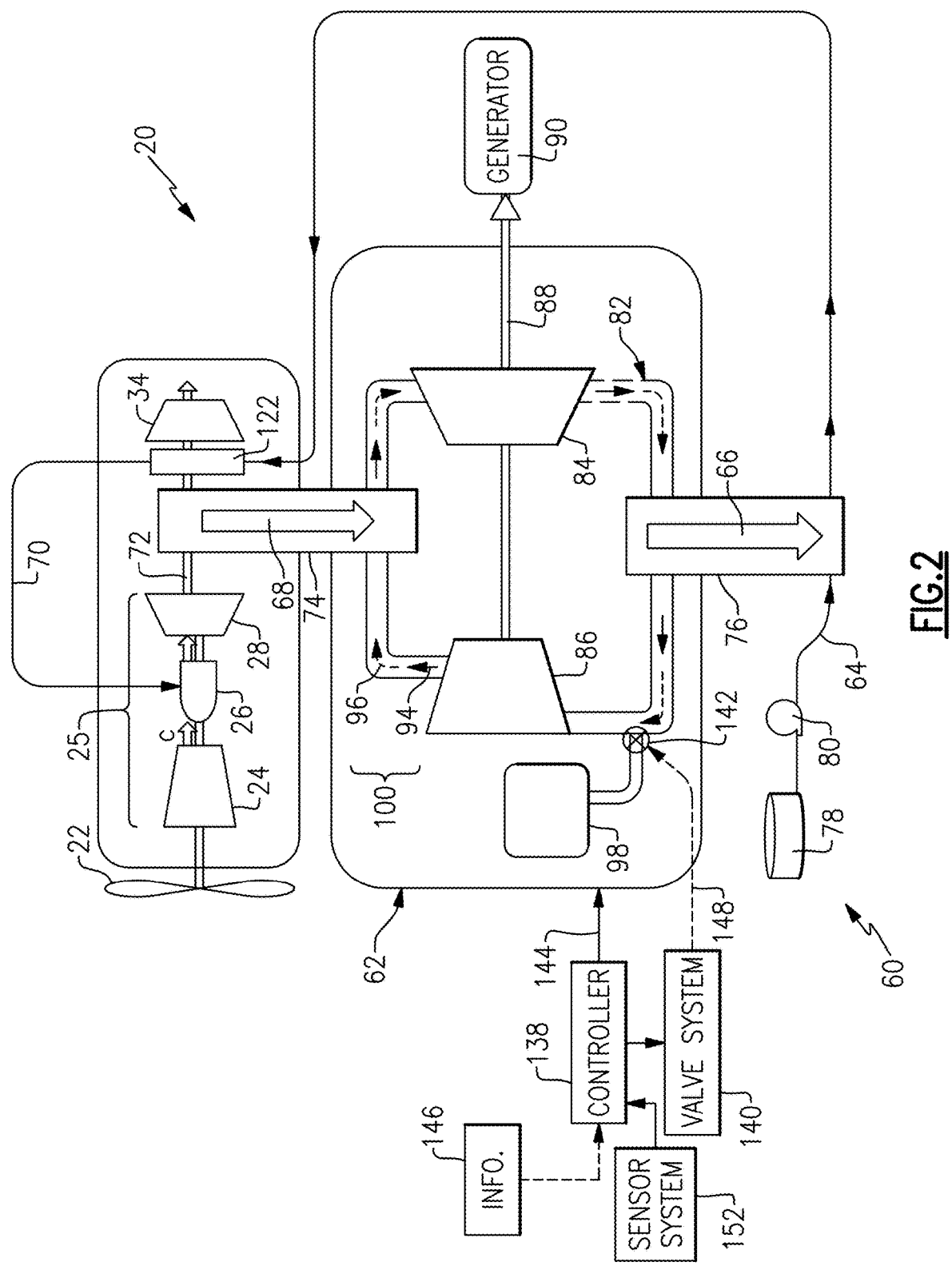
FIG. 2 is a simplified schematic view of the example aircraft propulsion system including the bottoming cycle.

Referring to FIG. 2 with continued reference to FIG. 1, the cryogenic fuel system 60 includes at least a fuel tank 78 and a fuel pump 80 to provide the liquid fuel flow 64 through a fuel passage to the combustor section 26. The example fuel system 60 is configured to provide a hydrogen based fuel such as a liquid hydrogen (LH$_2$). Although hydrogen is disclosed by way of example, other cryogenic, non-carbon based fuels could be utilized and are within the contemplation of this disclosure.

An exhaust heat exchanger 122 is disposed downstream of the bottoming heat exchanger 74 and provides further heating and transformation for the liquid fuel 64. The liquid fuel 64 accepts heat 66 from the working fluid mixture 100 in a fuel/working fluid heat exchanger 76. An additional amount of heat is input into the fuel flow in the exhaust heat exchanger 122. The fuel flow is eventually transformed into the vaporized fuel flow 70 that is injected into the combustor section 26 of the core engine 25. Additional heat input may be utilized to generate the vaporized fuel flow 70. The fuel flow may be in a mixed fluid/vapor state at other locations along the fuel flow path and accept and reject heat from other systems.

The fuel in the tank 50 incudes features for storing a cryogenic fuel at temperatures required to maintain the fuel in a liquid phase. Temperatures required to maintain the cryogenic fuel in a liquid phase may be as low as about −412° F. In one example embodiment, the cryogenic fuel is maintained at a temperature below 0° F. In another example embodiment, the fuel is maintained in the tank 50 at temperatures below −100° F. The cryogenic fuel may be maintained at temperatures below about −150° F. and as low as about −435° F.

The low temperatures of the cryogenic fuel 64 provide a source of heat absorption that is utilized in the bottoming cycle 62. The bottoming cycle 62 recovers thermal energy otherwise lost as waste heat exhausted through the nozzle 32.

The bottoming cycle 62 includes a closed circuit 82 within which the working fluid mixture 100 circulates. The working fluid mixture 100 is heated in the heat exchanger 68, compressed in the bottoming compressor 86 and expanded through bottoming turbine 84 to generate shaft power to drive the shaft 88. In one example embodiment, the shaft 88 is coupled to a generator 90. The shaft 88 may be coupled to drive other engine or aircraft accessory or auxiliary systems.

The working fluid mixture 100 is composed from two fluids with different properties. In one example embodiment, the working fluid mixture 100 includes a first fluid 94 and a second fluid 96. The example first and second fluids 94, 96 condense at different temperatures. Although the difference between the first and second fluids 94, 96 is related to condensation temperatures, other fluids with other differences that provide variations in performance at different operating conditions may also be utilized and are within the contemplation and scope of this disclosure.

The closed circuit 82 includes a location where condensing fluid may be separated from the working fluid mixture 100. In one example embodiment, a chamber 98 is provided in communication with the closed circuit 82. A condensing liquid may be communicated into the chamber 98 such that is it removed from circulation within the closed circuit 82. The chamber 98 is shown schematically and may be arranged in a location where a condensed liquid form of either the first fluid 94 and the second fluid 96 may gather and be removed from circulation. Removal of a portion of either of the first fluid 94 and/or the second fluid 96 changes operating characteristics of the working fluid mixture 100.

A valve system 140 including at least one valve 142 provides for control of fluid into and out of the chamber 98. The valve 142 may provide for separation between liquid and gaseous states or may be activated based on information indicative of current operation as indicated at 146. A controller 138 is programmed to operate the valve system 140. The valve system 140 may generate commands 144 to operate the at least one valve to control flow within the closed circuit 82. The controller 138 may further be programmed to generate commands 148 for controlling features of the bottoming cycle 62. In one example embodiment, the controller 138 is programmed to control operation and power generation by the bottoming cycle 62 based on the information 146. The information 146 may be indicative of engine, aircraft or system operation, ambient conditions, or any other information suitable for use in tailoring operation of the bottoming cycle 62. Additionally, the controller 138 receives information from a sensor system 154. The sensor system 154 may provide information indicative of the temperature, pressure and/or composition of the working fluid mixture 100. The sensor system 154 may also provide information indicative of current engine operating conditions that are utilized by the controller 138 in generating commands to control the valve system 140 and the bottoming cycle 62.

The example controller 138 is programmed to operate the valve system 140 as well as features and devices of the bottoming cycle 62 to vary and control operation and/or power production. The example controller 138 is a device and system for performing necessary computing or calculation operations of the valve system 140. The controller 138 may be specially constructed for operation of the valve system 140 and the bottoming cycle 62, or it may comprise at least a general-purpose computer selectively activated or reconfigured by software instructions stored in a memory device. The controller 138 may further be part of full authority digital engine control (FADEC) or an electronic engine controller (EEC).

Figure 3:
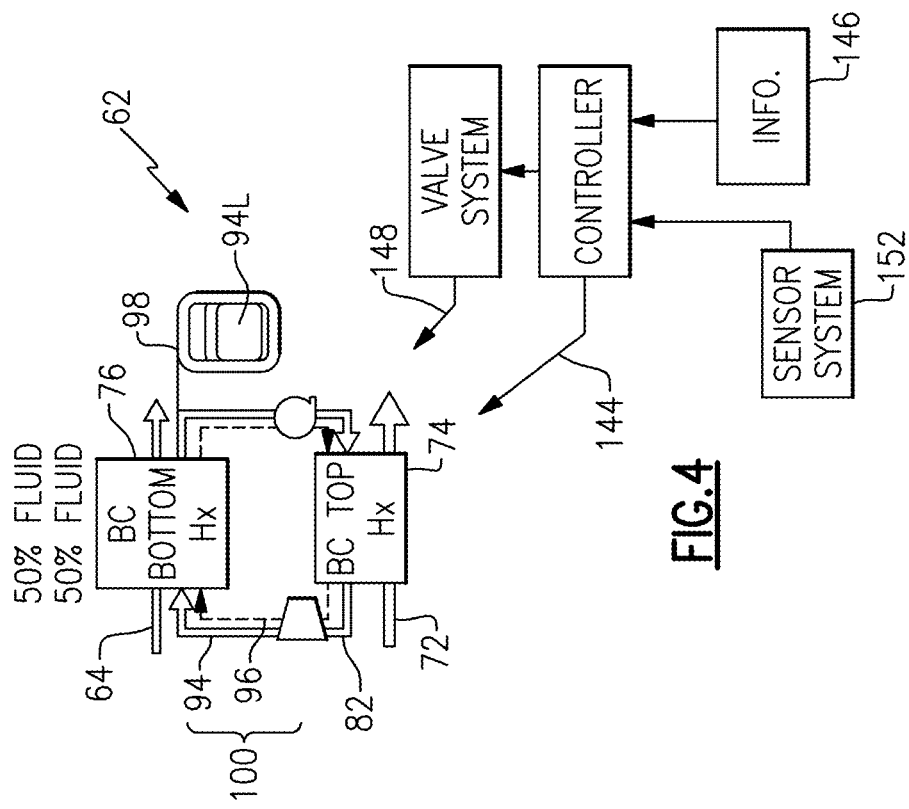
FIG. 3 is a schematic view of the example bottoming cycle of FIG. 2 in a first operating point.

Referring to FIG. 3 with continued reference to FIG. 2, the bottoming cycle 62 is shown in a simplified schematic view at a first operating condition. In the first operating condition, the working fluid mixture 100 includes mostly the first working fluid 94 and a lesser percentage of the second working fluid 96.

In the first operating condition, the chamber 98 is substantially empty as both the first and second fluids 94, 96 are in a gaseous or partial gaseous form and circulating through the closed circuit 82. In one example embodiment, the ratio of the first fluid 94 to the second fluid 96 is approximately 9 to 1. The example composition of the working fluid mixture 100 provides a desired operation that includes compression, heat absorption and expansion through the bottoming turbine 84. Although a ratio between the first and second fluids is disclosed by way of example, other ratios may be beneficial for a specific application and are within the contemplation and scope of this disclosure.

Moreover, the specific composition of each of the first fluid 94 and the second fluid 96 may be a homogenous compound or mixture. In one example embodiment, the first and fluid and the second fluid 94, 96 may be a combination and mixture of nitrogen, helium, supercritical carbon dioxide, and/or methane. The specific designation of first and second fluids would depend on the mixture. In one example embodiment, the first fluid 94 is nitrogen and the second fluid 96 is helium. Although example first and second fluids are disclosed, other fluids, mixtures and combination could be utilized and are within the scope and contemplation of this disclosure.

As the temperatures of the cryogenic fuel 64 and the exhaust gas flow 72 change, the optimal combination of the first fluid 94 and the second fluid 96 of the working fluid mixture 100 may also change. Accordingly, as temperatures changes, a portion of one of the first and second fluids 94, 96 may condense into a liquid form while the other remains in a substantially gaseous form. The condensed liquid accumulates in the chamber 98 such that it is removed from circulation within the closed circuit 82.

Moreover, changes to the working fluid mixture 100 may be facilitated by adjusting features of the bottoming cycle 62 based on information and inputs 146 regarding engine operation or aircraft operation. The controller 138 may control the valve system 140 to direct, route any, all, or a combination of the working fluid mixture 100, the cooling fuel flow 64 and the exhaust gas flow 72 to adjust a working temperature of the working fluid mixture 100.

Figure 4:
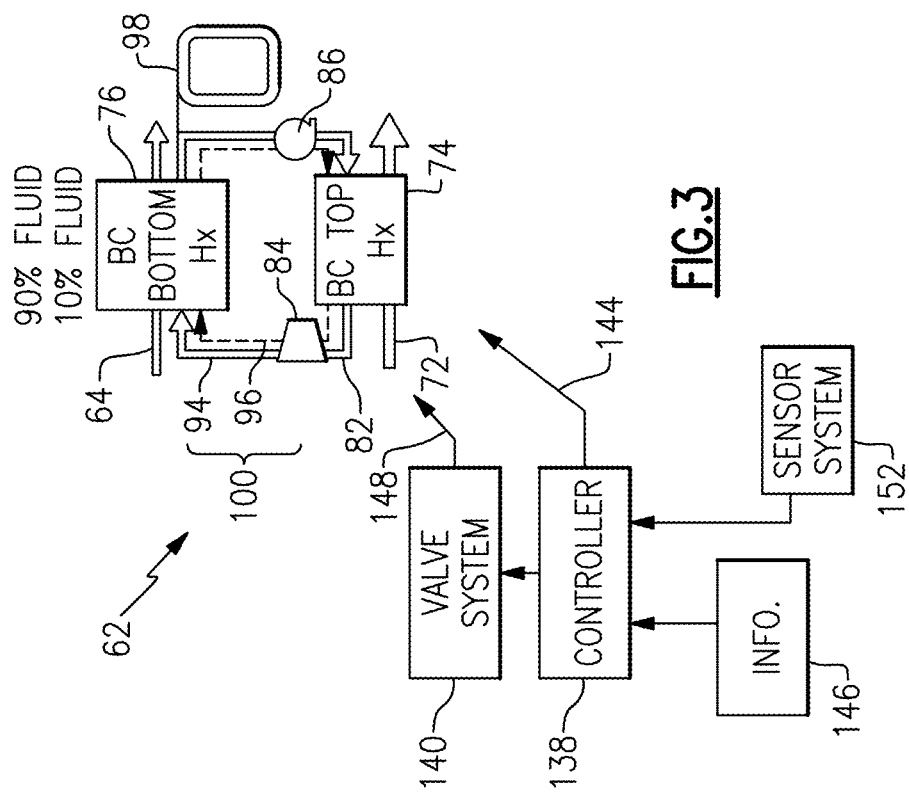
FIG. 4 is a schematic view of the example bottoming cycle of FIG. 2 in a second operating point.

Referring to FIG. 4, with continued reference to FIGS. 2 and 3, the bottoming cycle 62 is shown at a second operating condition. In the second operating condition, the combination of the first fluid 94 and the second fluid 96 of the working fluid mixture 100 is different than that of the first operating condition.

In the example second operating condition, a portion of the first fluid 94 has condensed into a liquid form and accumulates within the chamber 98. The removal of a portion of the first fluid 94 from circulation within the closed circuit changes the ratio between the fluids to change the operating characteristics of the working fluid mixture 100. In one example embodiment, the ratio of the first fluid 94 to the second fluid 96 within the closed circuit is 1 to 1. The condensed liquid of the first fluid indicated at 94L within the chamber 98 is not considered in the ratio between the first fluid 94 and the second fluid 96 of the working fluid mixture.

The changes in the ratio between fluids 94, 96 is facilitated by changes in temperatures of the working fluid mixture 100. Changes in the working temperature of the working fluid mixture 100 occur in response to changes in heat input within the first heat exchanger 74 and heat output into the fuel flow 64 in the fuel/working fluid heat exchanger 76. In an example embodiment, changes to the working fluid mixture 100 may continually change in response to changes in temperature.

Although temperature is disclosed by way of example, the working fluid mixture 100 may vary in response to other changes within the closed circuit caused by input heat 68 and output heat 66. Moreover, although two operating conditions are shown and described by way of example, additional operating conditions may be utilized and are within the contemplation of this disclosure. Moreover, changes in the ratio of the fluids 94, 96 may vary continuously to accommodate current operating conditions rather than changing in steps at discrete defined operating points.

Figure 5:
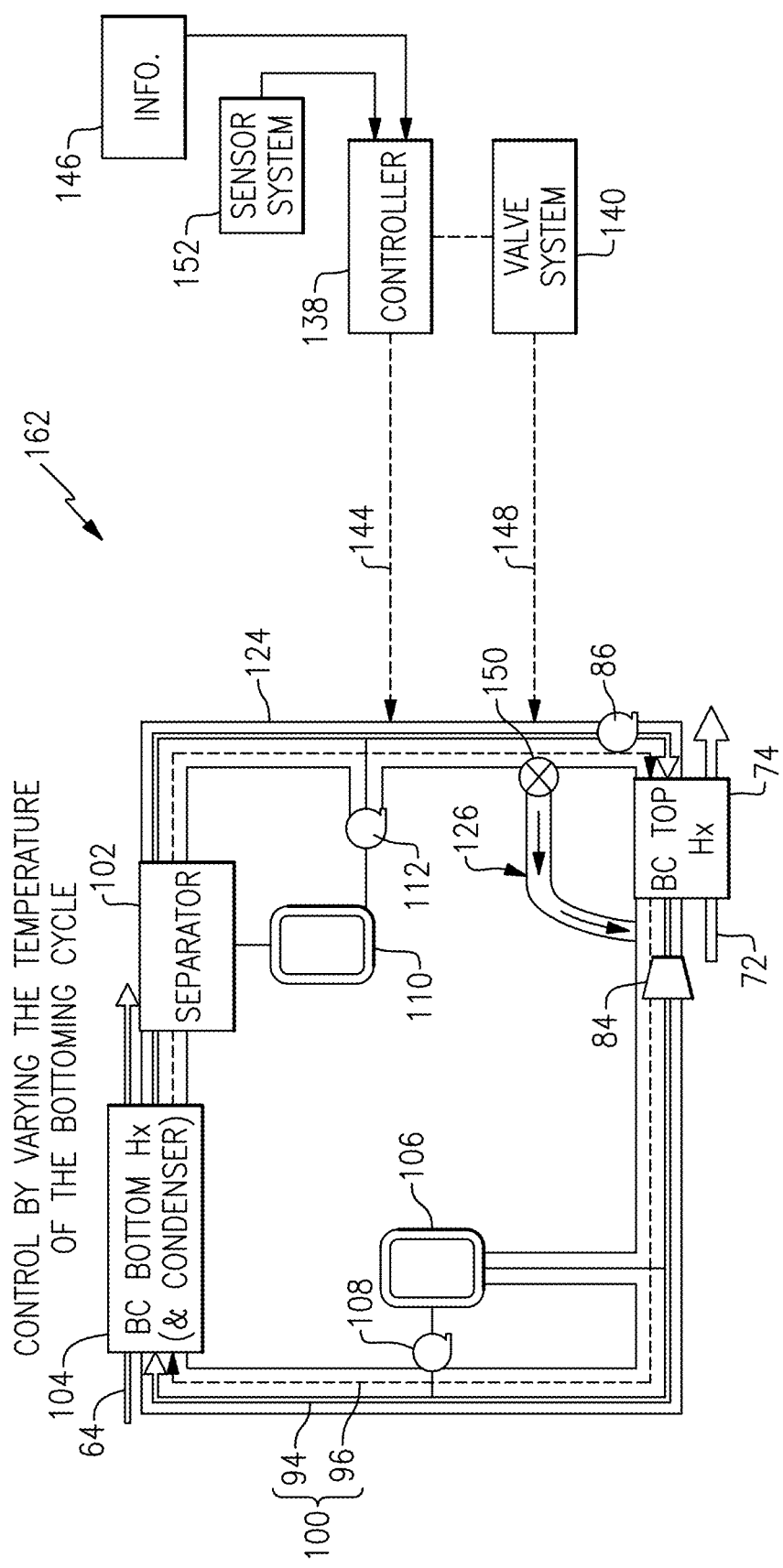
FIG. 5 is a schematic view of another example bottoming cycle.

Referring to FIG. 5, another example bottoming cycle 162 is indicated and includes a separator 102 where condensed liquid is removed from the closed circuit 124. Changes in pressure and/or temperatures are utilized to change the ratio of fluids in the working fluid mixture 100. In a condenser 104, fuel flow 64 is used to cool the working fluid mixture 100. The amount of cooling may be controlled to control the temperature of the working fluid mixture 100. Condensed liquid may be separated from the working fluid mixture 100 within the separator 102 and communicated into a first chamber 110. Condensation of one of the fluids 94, 96 of the working fluid 100 may be initiated by changing temperature or pressure. Condensed liquid stored in the chamber 110 may be reintroduced into the closed circuit 124 and pressurized by a pump 112.

A charging chamber 106 may be included with a quantity of one of the first fluid 94 or the second fluid 96. The charging chamber 106 provides for injection of additional portions of one of the fluids 94, 96 to vary the working mixture 100. In one example embodiment, a pump 108 is provided to pressurize fluid for introduction into the closed circuit 124.

In one example embodiment, entry of condensed fluid into the separator 102 is initiated by changing a loop pressure within the closed circuit 124. The increased pressure may be provided by increasing pressure with the pump 86. Alternatively, additional fluid may be injected into the closed circuit 124 from the charging chamber 100. Increased pressures on the working fluid mixture 100 may be used to condense one of the fluids 94, 96. Moreover, both fluids 94, 96 may condense in response to a change in temperature or pressure, but at different ratios. Accordingly, the fluid within the charging chamber 106 may include a portion of both of the fluids 94, 96 that are pumped and injected into the closed circuit 124 at different ratios corresponding to different temperatures and/or pressures.

The example closed circuit 124 includes a bypass passage 126 through which a portion or all of the working fluid mixture 100 may flow to regulate heat input. The flow through the bypass passage 126 is not heated and therefore can be utilized to modulate temperature of the working fluid mixture 100.

In one example embodiment, the controller 138 actuates the valve system 140 to adjust at least one valve schematically shown at 150 to control a bypass flow of working fluid mixture 100. Control of the bypass flow around the heat exchanger 74 may be utilized to adjust and control a temperature of the working fluid mixture 100. The controller 138 may also control other features of the bottoming cycle 162 to alter and control temperatures. The features and devices that maybe controlled include the pumps 108, 112, the compressor 86 and the bottoming turbine 84. Other devices may also be included and controlled to provide for adjustment of the working fluid mixture 100.

In another example embodiment, temperature, and pressure of the working fluid mixture 100 is regulated by operation of the turbine 84. Adjusting the amount of work taken out of the bottoming cycle 162 changes temperatures and pressures within the closed circuit 124 that is compensated by variation of the working fluid mixture 100.

Figure 6:
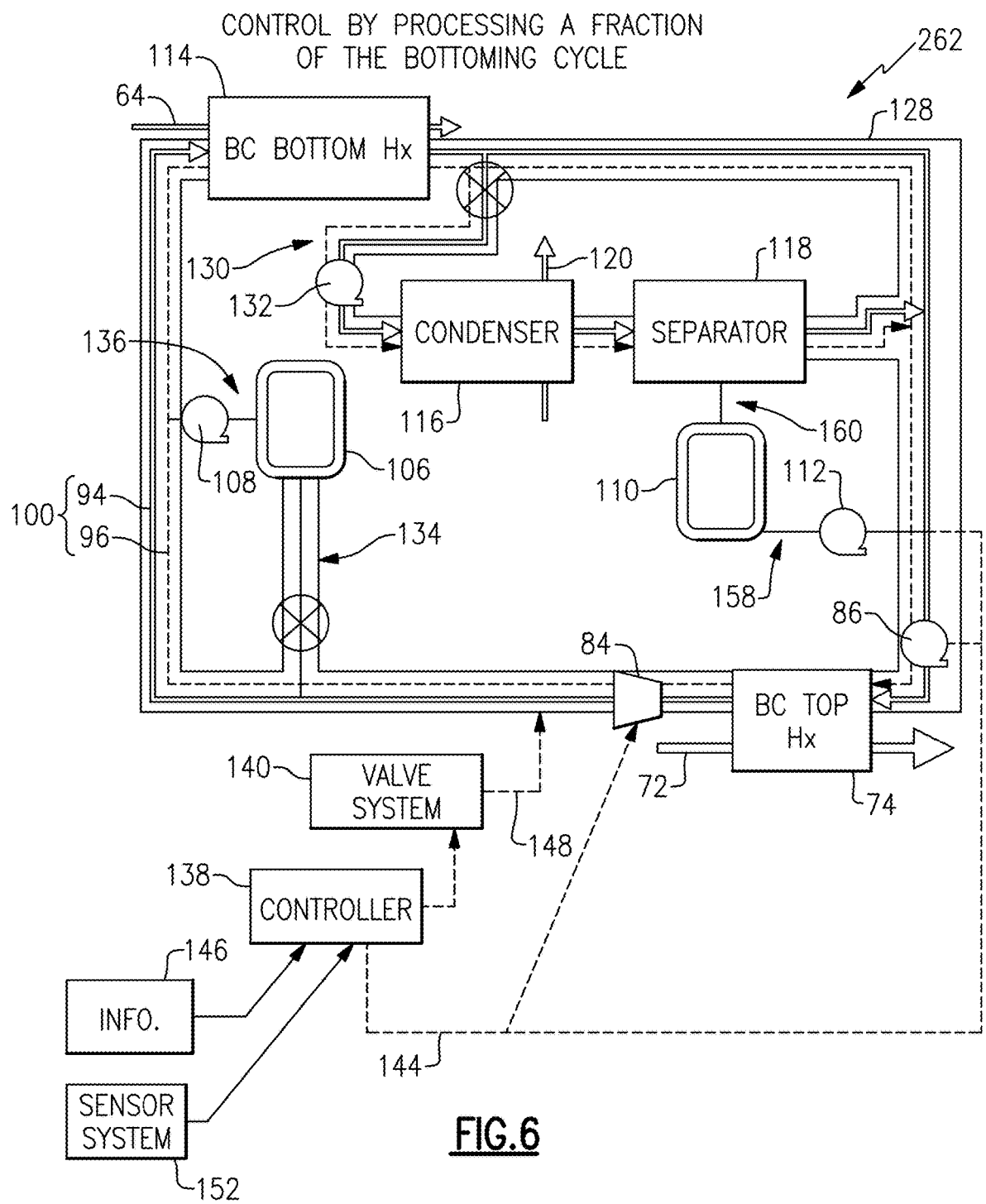
FIG. 6 is a schematic view of yet another example bottoming cycle.

Referring to FIG. 6, another bottoming cycle 262 is schematically shown and includes a heat exchanger 114 and a condenser 116 that are independently operable to control temperature, pressure and flows of the working fluid mixture 100. Changing any one, a combination or all of the temperature, pressure, and flow of the working fluid mixture 100 provides for varying the ratio of the first and second fluids 94, 96 that changes performance. The bottoming cycle 262 includes a closed circuit 128 with a bypass passage 130 to route a portion of the working fluid mixture 100 around the condenser 116 and a separator 118. The condenser 116 is in communication with cooling flow 120 that provides for condensing into a liquid form a portion of the working fluid mixture 100. In one example embodiment, condensed portions of the working fluid mixture 100 is separated in the separator 118 and communicated to a chamber 110. The gaseous portion of the working fluid mixture 100 is communicated back into the closed circuit 128.

All, a portion or none of the working fluid mixture 100 may be communicated through the condenser 116. Flow through the condenser 116 may be aided by a pump 132 within the bypass passage 130. A pump 112 is provided for selectively communicating a portion of the working fluid mixture 100 back into circulation within the closed circuit 128. The example chamber 110 includes an inlet 160 to receive condensed liquid from the separator 118. The chamber 110 includes the outlet 158 in communication with the pump 112 for reintroducing working fluid mixture 100 into the closed circuit 128.

A charging chamber 106 is provided and may contain additional working fluid mixture 100 for communication into the closed circuit 128. The example charging chamber 106 is in communication with the closed circuit through an inlet 134. An outlet 136 and pump 108 provide for introduction of the working fluid mixture 100 stored in the charging chamber 106.

The controller 138 is programmed to control the devices of the bottoming cycle 262 and the valve system 140. In one example embodiment, the valve system 140 includes at least valves 154 and 156. The valve 154 controls flow through the bypass passages 130. Valve 156 controls flow into the charging chamber 106. Although valves 154 and 156 are disclosed by way of example, other valves and associated flow control devices may be utilized for control of fluid flow and operation of the bottoming cycle 262.

According to an example operational embodiment, one or both of the fuel flow 64 and the exhaust gas flow 72 may be adjusted to adjust a temperature and pressure of the working fluid mixture circulating within the closed circuit 128. The circulating working fluid mixture 100 is compressed in the compressor 86 heated by the exhaust gas flow 72 and then expanded through the bottoming turbine 84. Adjustment of either or both the cooling fuel flow 64 and the exhaust gas flow 72 changes the temperature of the working fluid mixture 100. Changes in the working fluid mixture 100 are provided by condensing a portion of one or both the first fluid 94 and the second fluid 96. The first fluid 94 and the second fluid 96 are different and therefore condense at different temperatures. Accordingly, the change in the working fluid mixture 100 provides for the variation in the working fluid mixture 100. Condensed portions of the first and second fluids 94, 96 are stored in one of the chambers 110 or 106. The amount of a composition of the working fluid mixture 100 is balanced based on the temperature and pressure to optimize generation of power generated by the turbine 84.

Further control of the working fluid mixture 100 is provided in the example bottoming cycle 262 by controlling how much, if any, of the working fluid mixture 100 is additionally cooled in the condenser 116. The cooling flow 120 through the condenser 116, may be a portion of the fuel flow, a bypass airflow, or any other cooling flow available as part of an aircraft propulsion system. The example working fluid mixture 100 may be continuously adjusted and varied in response to changes in temperature within the closed circuit 128. The bottoming cycle 262 may also be operated to set a temperature of the working fluid mixture 100 to optimize operation through the compressor 86 and the bottoming turbine 84.

Accordingly, disclosed example bottoming cycles includes a working fluid mixture that may vary to adapt and tailor operation and power production to current engine operating conditions including available thermal energy and cooling capacities.

Although embodiments of this disclosure have been shown, a worker of ordinary skill in this art would recognize that modifications would come within the scope of this disclosure. For that reason, the following claims should be studied to determine the true scope and content of this disclosure.

What is claimed is:

1. An aircraft propulsion system comprising:
   a core engine comprising a main compressor where an inlet airflow is compressed and communicated to a combustor to generate an exhaust gas flow that is expanded through a main turbine section to generate power used to drive the main compressor and a propulsive fan;
   a bottoming cycle where a working fluid mixture within a closed circuit is heated and expanded through a bottom turbine to generate shaft power, wherein the working fluid mixture comprises at least two fluids having different properties that change a capability of the working fluid mixture at different bottoming cycle operating points;
   a first heat exchanger where heat is input into the working fluid mixture; and
   a second heat exchanger where the working fluid mixture is cooled.

2. The aircraft propulsion system as recited in claim 1, further comprising a cryogenic fuel system comprising a cryogenic fuel storage tank, a fuel flow path for routing the cryogenic fuel to the combustor of the core engine, wherein the second heat exchanger provides for thermal communication between fuel flow in the fuel flow path and the working fluid mixture.

3. The aircraft propulsion system as recited in claim 2, wherein the first heat exchanger communicates thermal energy from the exhaust gas flow into the working fluid mixture.

4. The aircraft propulsion system as recited in claim 1, wherein the different bottoming cycle operating points comprise different temperatures of the working fluid mixture.

5. The aircraft propulsion system as recited in claim 1, wherein the working fluid mixture comprises a first fluid with a first condensation temperature and a second fluid with a second condensation temperature that is different than the first condensation temperature, and the capability of the working fluid mixture varies in response to a ratio between the first fluid and the second fluid.

6. The aircraft propulsion system as recited in claim 5, further comprising a controller programmed to operate the bottoming cycle to vary a ratio between the first fluid and the second fluid that comprise the working fluid in response to an operating condition of the core engine.

7. The aircraft propulsion system as recited in claim 5, further comprising at least one fluid chamber in fluid communication with the closed circuit of the bottoming cycle where at least a portion of one of the first fluid and the second fluid accumulates separate from the working fluid mixture circulating within the closed circuit in response to a predefined temperature of the working fluid mixture.

8. The aircraft propulsion system as recited in claim 7, wherein at least one fluid chamber comprises a first fluid chamber where the first fluid accumulates and a second fluid chamber where the second fluid accumulates.

9. The aircraft propulsion system as recited in claim 8, further comprising at least one separator for separating one of the first fluid and the second fluid from the closed circuit.

10. The aircraft propulsion system as recited in claim 9, further comprising at least one condenser for condensing one of the first fluid and the second fluid of the working fluid mixture.

11. The aircraft propulsion system as recited in claim 10, further comprising a first fluid pump where the first fluid from the first chamber is pressurized and a second pump where the second fluid from the second chamber is pressurized.

12. A gas turbine engine comprising:
a core engine comprising a main compressor where an inlet airflow is compressed and communicated to a combustor to generate an exhaust gas flow that is expanded through a main turbine section to generate power used to drive the main compressor;
a bottoming cycle where a working fluid mixture within a closed circuit is heated and expanded through a bottom turbine to generate shaft power, wherein the working fluid mixture comprises at least two fluids having different properties that change a capability of the working fluid mixture at different bottoming cycle operating points;
a cryogenic fuel system comprising a cryogenic fuel storage tank, a fuel flow path for routing the cryogenic fuel to the combustor of the core engine;
a first heat exchanger where heat from the core engine is input into the working fluid mixture;
a second heat exchanger where the working fluid mixture is cooled by a flow of the cryogenic fuel; and
a controller programmed to operate the bottoming cycle to vary a composition of the working fluid mixture in response to an operating condition of the core engine.

13. The gas turbine engine as recited in claim 12, wherein the working fluid mixture comprises a first fluid with a first condensation temperature and a second fluid with a second condensation temperature that is different than the first condensation temperature, and the capability of the working fluid mixture varies in response to a ratio between the first fluid and the second fluid.

14. The gas turbine engine as recited in claim 13, further comprising at least one fluid chamber in fluid communication with the closed circuit of the bottoming cycle where at least a portion of one of the first fluid and the second fluid accumulates separate from the working fluid mixture circulating within the closed circuit in response to a predefined temperature of the working fluid mixture.

15. The gas turbine engine as recited in claim 14, further comprising at least one separator for separating one of the first fluid and the second fluid from the closed circuit.

16. The gas turbine engine as recited in claim 15, further comprising at least one fluid pump for pressurizing one of the first fluid and the second fluid independent of pressures within the closed circuit.

17. A method of operating an aircraft propulsion system comprising:
generating an exhaust gas flow in a combustor by igniting a mixture of compressed air and a cryogenic fuel;
communicating thermal energy from the exhaust gas flow into a working fluid mixture within a bottoming cycle where a heated working fluid within a closed circuit is heated and expanded through a bottom turbine to generate shaft power, wherein the working fluid mixture comprises at least two fluids having different properties that change a capability of the working fluid mixture at different bottoming cycle operating points;
cooling the working fluid exhausted from the bottoming turbine in a fuel/working fluid heat exchanger where a cryogenic fuel accepts heat from the working fluid mixture; and
adjusting a composition of the working fluid mixture by removing a condensed portion of the first fluid and the second fluid from circulation through the closed circuit of the bottoming cycle.

18. The method as recited in claim 17, further comprising adjusting the working fluid mixture to provide a first ratio between the first fluid and the second fluid in response to a first operating condition of the aircraft propulsion system and adjusting the working fluid mixture to provides a second ratio between the first fluid and the second fluid in response to a second operating condition of the aircraft propulsion system.

19. The method as recited in claim 18, further comprising adjusting the working fluid mixture by condensing, separating, and storing one of the first fluid and second fluid.

20. The method as recited in claim 18, further comprising adjusting the working fluid mixture by injecting a liquid form of one of the first fluid and the second fluid back into the closed circuit of the bottoming cycle.

* * * * *